J. WILEY.
KETTLE.

No. 172,538.  Patented Jan. 18, 1876.

WITNESSES
Claudius L. Parker
J. E. Boggs

INVENTOR
James Wiley,
by George H. Christy,
his Atty.

UNITED STATES PATENT OFFICE.

JAMES WILEY, OF ALLEGHENY, PENNSYLVANIA.

IMPROVEMENT IN KETTLES.

Specification forming part of Letters Patent No. 172,538, dated January 18, 1876; application filed November 22, 1875.

*To all whom it may concern:*

Be it known that I, JAMES WILEY, of Allegheny, county of Allegheny, State of Pennsylvania, have invented or discovered a new and useful Improvement in Kettles; and I do hereby declare the following to be a full, clear, concise, and exact description thereof, reference being had to the accompanying drawing making a part of this specification, in which like letters indicate like parts.

Figure 1:
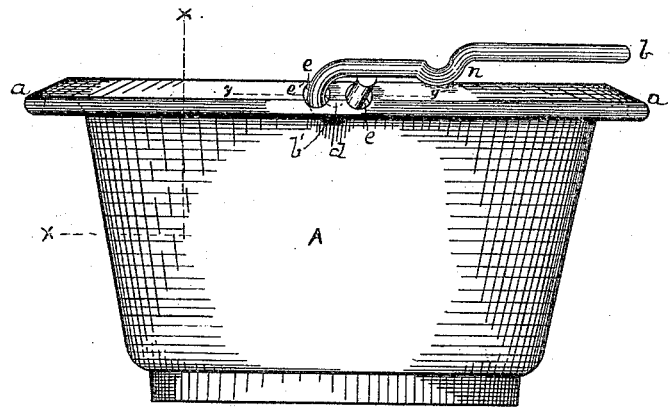
Figure 2:
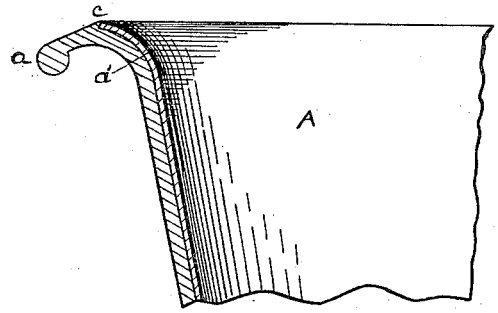
Figure 3:
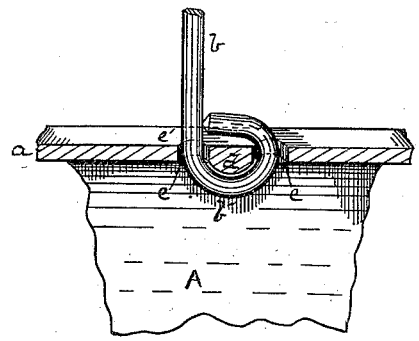

Figure 1 is a reduced side elevation of a kettle containing my improvement. Fig. 2 is vertical section of the upper edge of one side of the kettle in the plane of the line $x\,x$, Fig. 1, and Fig. 3 is a vertical section through the fastening or connection of one end of the bail to the kettle in the line $y\,y$, Fig. 1.

In so far as matters of mere shape enter into the kettle or its construction, they form the subject-matter of an application for a design-patent, and they are included herein with more particular reference to the elements of utility resulting from such shapes.

The kettle A is made by casting, or in any known way, and, preferably, of about the form shown. But in casting or otherwise making it, I make with it a rim, $a$, projecting outward horizontally, or, preferably, falling below a horizontal plane both on its upper and under face. The mouth of the kettle, just below the rim, is made, by preference, with a considerable of a flare, as shown at $a'$, for a depth of from one to two inches, according to the size of the kettle, more or less, and from that point down the body of the kettle tapers somewhat downwardly toward the lower end. The rim $a$ not only adds materially to the appearance of the kettle, but also is designed for use, at any desired point, as a handle in tilting the kettle, and at the opposite side as a delivery-spout in emptying out the contents, and for such uses the opposite sides are interchangeable, and the kettle may be tilted and emptied in any direction.

To the inside of the kettle the usual enamel or porcelain lining is applied by any known process. Such linings most commonly scale, chip off, or break away at or along the exposed upper edge. To prevent this I make around the mouth of the metal part of the kettle a lip or bead, $c$, under and against which the enamel is applied. This projecting or overlapping lip or bead prevents the edge of the enamel, to a great extent, from being broken off by the abrasion to which it is especially subject in common use, and also makes so perfect a joint at that point as materially to lessen the liability to scale or peel off from other causes.

As a means of fastening the bail $b$ I make two holes, $e\,e$, in the rim $a$, on opposite sides of the kettle, and the intermediate part $d$, forming a lug for the bail-loops $b'$, I enlarge sufficiently to secure the necessary strength. The ends of the bail are inserted in the holes $e\,e$, and bent into loop form, with the ends passing under, up, and back, so that when the bail is raised vertically and carried a little past the center it shall come against the opposite side or wall $e'$ of the hole $e$, through which it is inserted. In this way I provide a stop for the bail, so that when used it shall always stand nearly or quite at right angles to the plane of the kettle's mouth. When the bail is down it is supported a little above the edge of the kettle by a rest formed by making an elbow, curve, or deflection, $n$, at any desired point, which, resting on the edge or rim $a$ of the kettle, shall hold the main or handle part of the bail clear of the kettle.

Instead of holes $e\,e$, recesses may be cut in the rim $a$ at proper intervals, and, in so far as relates to the bail connection, the lug $d$ and back-rest $e'$ may be used without the extension of the rim $a$ entirely around the kettle.

I claim herein as my invention:

1. A kettle having a rim, $a$, projecting outwardly, and in or below a horizontal plane, and also extending around the mouth of the kettle, substantially as and for the uses set forth.

2. In a porcelain-lined or enameled metallic kettle a shoulder, $c$, overlapping the enamel or lining at its upper edge, substantially as set forth.

3. The holes $e\,e$, or equivalent recesses, forming an intermediate lug, $d$, and a back rest for the bail, substantially as set forth.

4. The elbow-curve or deflection $n$ in the bail, for the purposes set forth.

In testimony whereof I have hereunto set my hand.

JAMES WILEY.

Witnesses:
   JAMES M. CHRISTY,
   GEORGE H. CHRISTY.